(12) United States Patent
Zhao (10) Patent No.: US 10,605,324 B2
(45) Date of Patent: Mar. 31, 2020

(54) HOUSEHOLD APPLIANCE FOOT AND HOUSEHOLD APPLIANCE

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventor: Zhiqiang Zhao, Shandong (CN)

(73) Assignees: QINGDAO HAIER WASHING MACHINE CO., LTD., Qingdao, Shandong (CN); QINGDAO HAIER SMART TECHNOLOGY R&D CO., LTD., Qingdao, Shandong (CN)

(*) Notice: Subject to any disclaimer, the term of this patent is extended or adjusted under 35 U.S.C. 154(b) by 123 days.

(21) Appl. No.: 15/750,927

(22) PCT Filed: Jun. 29, 2017

(86) PCT No.: PCT/CN2017/090850
§ 371 (c)(1),
(2) Date: Feb. 7, 2018

(87) PCT Pub. No.: WO2018/171069
PCT Pub. Date: Sep. 27, 2018

(65) Prior Publication Data
US 2019/0154107 A1    May 23, 2019

(30) Foreign Application Priority Data
Mar. 22, 2017 (CN) .......................... 2017 1 0173540

(51) Int. Cl.
*F16F 15/023* (2006.01)
*F16F 15/027* (2006.01)
(Continued)

(52) U.S. Cl.
CPC .......... *F16F 15/023* (2013.01); *D06F 39/125* (2013.01); *F16F 15/0275* (2013.01);
(Continued)

(58) Field of Classification Search
CPC .. F16F 15/023; F16F 15/0275; F16F 2222/12; F16F 2228/066; G12B 5/00; A47B 91/02; D06F 39/125
See application file for complete search history.

(56) References Cited

U.S. PATENT DOCUMENTS 2,635,838 A * 4/1953 Branson ................ F16F 15/023
248/562
3,191,895 A * 6/1965 Whelan ..................... F16F 9/19
248/570

(Continued)

*Primary Examiner* — Eret C McNichols
(74) *Attorney, Agent, or Firm* — Buchanan Ingersoll & Rooney PC (57) ABSTRACT

A household appliance foot comprises a hydraulic plate; a sheath, fixedly connected with the hydraulic plate; a regulating foot, arranged in the sheath and being axially movable relative to the sheath; an accommodation chamber, formed by the hydraulic plate, the sheath and the regulating foot; a hydraulic medium, in the accommodation chamber and being compressed or expanding with pressure changes to drive the regulating foot to axially move in the sheath for leveling; a communicating device, communicating between at least two household appliance feet for allowing the hydraulic medium to flow between the household appliance feet; and a throttling structure, arranged in the communicating device for slowing down a flow velocity of the hydraulic medium. The throttling structures are arranged in the communicating devices, so that the rapid flowing of the hydraulic medium among the household appliance feet is prevented, and a regulating process can be more stable.

13 Claims, 5 Drawing Sheets

(51) Int. Cl.
*D06F 39/12* (2006.01)
*G12B 5/00* (2006.01)
*A47B 91/02* (2006.01)

(52) U.S. Cl.
CPC ........... *A47B 91/02* (2013.01); *F16F 2222/12* (2013.01); *F16F 2228/066* (2013.01); *F16F 2230/0011* (2013.01); *F25D 2323/0011* (2013.01); *G12B 5/00* (2013.01)

(56) References Cited

U.S. PATENT DOCUMENTS

| | | | | |
|---|---|---|---|---|
| 3,768,766 | A * | 10/1973 | Bain | A47B 91/16 248/188.2 |
| 4,625,424 | A * | 12/1986 | de la Haye | G12B 5/00 248/649 |
| 6,009,815 | A * | 1/2000 | Hartman | A47B 91/02 108/147 |
| 8,104,724 | B2 * | 1/2012 | Sorohan | A47B 91/16 248/188.3 |
| 10,221,517 | B2 * | 3/2019 | Zhao | D06F 39/12 |
| 10,227,723 | B2 * | 3/2019 | Zhao | A47B 91/16 |
| 10,294,602 | B2 * | 5/2019 | Zhao | D06F 39/125 |
| 2003/0193000 | A1 * | 10/2003 | Leveridge | E06C 7/44 248/188.2 |
| 2006/0021391 | A1 * | 2/2006 | Yim, II | D06F 39/12 68/3 R |
| 2006/0180720 | A1 * | 8/2006 | Cournoyer | A47B 91/02 248/188.2 |
| 2008/0190696 | A1 * | 8/2008 | Pike | A47B 91/10 182/202 |
| 2010/0224745 | A1 * | 9/2010 | Orlov | F16M 7/00 248/188.3 |
| 2012/0193503 | A1 * | 8/2012 | Pike | A47B 91/16 248/560 |
| 2013/0313385 | A1 * | 11/2013 | Mora | F16M 7/00 248/188.4 |
| 2018/0271279 | A1 * | 9/2018 | Ozagir | E06C 7/44 |

* cited by examiner

HOUSEHOLD APPLIANCE FOOT AND HOUSEHOLD APPLIANCE

TECHNICAL FIELD

The present disclosure relates to the technical field of support leveling of household appliances, and specifically relates to a household appliance foot and a household appliance.

BACKGROUND

A household appliance is generally provided with a leveling device at the bottom of its casing. During placement of the household appliance, the leveling device is adjusted to make the household appliance stably placed. After the household appliance is leveled, the leveling device can support the household appliance to keep the household appliance stable.

Taking a washing machine for example, the existing washing machine is usually provided with bolt feet mounted at the bottom of its casing or the whole machine. Each bolt foot comprises a screw rod, a nut washer and a rubber pad, the nut washer can be screwed up and down around the screw rod, and the screw rod can also be screwed up and down in a screw hole in a base plate of the casing. Therefore, the height of the washing machine can be adjusted by screwing the screw rods of the bolt feet into different lengths of the screw holes of the base plate. Mostly, the height of the washing machine is increased if the feet of the washing machine rotate counterclockwise, and the height of the washing machine is reduced if the feet of the washing machine rotate clockwise. After the height adjustment of the bolt feet is completed, the nut washers for preventing loosening are tightened to keep the washing machine stable.

Although said bolt feet of the washing machine implement the leveling of the washing machine, a user still needs to carry out manual adjustment. If the washing machine has a relatively large self-weight or a placement space for the washing machine is narrow, it is very inconvenient to operate for user. Additionally, vibration of the washing machine in a long-term working process also act on the leveling feet and causes support failure of the feet, resulting in unlevel placement of the washing machine.

For example, an existing 80 KG drum washing machine generally has a weight of about 80 KG, which is relatively heavy, so its height adjustment is very inconvenient for users. Even though the height adjustment is completed, it cannot be ensured that the washing machine is adjusted to an optimal state. When the washing machine works, especially accelerates from 0 r/min to about 1400 r/min for drying, large vibration will occur if the washing machine is placed unlevel or has a failure of support problem, which greatly influences use comfortableness of the user.

In addition, the vibration of the unlevel washing machine may cause loosening of foot screws, which result in vertical movement of a foot bracket, and such unstability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In view of the foregoing, the present disclosure is proposed.

SUMMARY

In order to solve the above-mentioned problems, a first disclosure object of the present disclosure is to provide a household appliance foot, and concretely, a technical solution adopted by the present disclosure is as follows.

A household appliance foot comprises:
a hydraulic plate;
a sheath, being fixedly connected with the hydraulic plate;
a regulating foot, being arranged in the sheath and being axially movable relative to the sheath;
an accommodation chamber, being formed by the hydraulic plate, the sheath and the regulating foot;
a hydraulic medium, being in the accommodation chamber and being compressed or expanding with pressure changes to drive the regulating foot to axially move in the sheath for leveling;
a communicating device, communicating at least two household appliance feet for allowing the hydraulic medium to flow between the household appliance feet; and
a throttling structure, being arranged in the communicating device for slowing down a flow velocity of the hydraulic medium.

Further, the communicating device comprises a hydraulic pipe and a communicating member, and at least two household appliance feet are connected with the same communicating member through hydraulic pipes respectively for communicating with each other. The throttling structure is arranged in the communicating member.

Further, a throttling flow passage is arranged in the communicating member, and both ends of the throttling flow passage separately communicate with hydraulic pipes. So that the flowing damping force of the hydraulic medium is allowed to increase by the throttling flow passage for reducing the flow velocity of the hydraulic medium; and a diameter of the throttling flow passage is smaller than that of hydraulic pipe communicated with the throttling flow passage; or, the throttling flow passage comprises a diameter-reduced part to form a throttling hole.

Further, a pouring port for pouring the hydraulic medium is arranged in the communicating members. A sealing device is mounted on the pouring port in a sealing manner, and the throttling flow passages pass through the pouring ports.

Further, a diameter of the throttling flow passage at a position connected with the pouring ports is reduced to form the throttling holes;

or, diameters of a middle part of the throttling flow passages located at one side of the pouring port are reduced to form the throttling hole.

Further, the pouring port is a screw hole, and the sealing device comprises a bolt and a sealing ring. The bolt is mounted in the screw hole, and the sealing ring is arranged between the bolt and the screw hole for sealing connection.

Further, a minimum diameter d of the throttling flow passages meets that: 6 mm; preferably, $d \leq 2$ mm; and further preferably, $d \leq 1$ mm.

Further, hydraulic nozzles are arranged on the hydraulic plate for allowing the hydraulic medium to flow out. Two household appliance feet communicate with each other through a hydraulic pipe. The diameter of the hydraulic pipe is smaller than that of the hydraulic nozzle, and a flowing damping force of the hydraulic medium is increased to reduce the flow velocity of the hydraulic medium.

Further, a liquid flow passage for allowing the hydraulic medium to flow is formed in the communicating device. The throttling structure is arranged in the liquid flow passage to allow the flowing damping force of the hydraulic medium to increase for reducing the flow velocity of the hydraulic medium.

A second object of the present disclosure is to provide a household appliance with the household appliance foot according any one of the above-mentioned items, comprising at least two household appliance feet communicated with each other through the communicating member so as to allow the hydraulic medium to flow between the household appliance feet.

According to the household appliance foot provided by the present disclosure, based on the hydraulic principle, the regulating foot can perform adaptive regulation automatically because of the fluidity of the hydraulic medium due to different pressures resulting from unflatness. And the hydraulic medium stops circulating until the household appliance foot achieves balance, and thus, automatic leveling is achieved.

The household appliance feet provided by the present disclosure communicate with each other through the communicating devices, thus, the hydraulic medium can flow among the household appliance feet to achieve automatic leveling.

The throttling structures are arranged in the communicating devices, so that the rapid flowing of the hydraulic medium among the household appliance feet is prevented, and a regulating process can be more stable. In addition, in view of the condition that pressure of the household appliance feet changes greatly, the throttling structures can cushion well to avoid the damage of the household appliance feet caused by the sudden and rapid flowing of the hydraulic medium. According to the present disclosure, the yielding parts are formed in the hydraulic plate corresponding to the guiding limiting mechanisms. While meeting the setting of the guide limiting mechanism, it does not affect the axial movement of the regulating foot, so as to reduce the overall height of the household appliance foot and improve the damping stability.

According to the household appliance provided by the present disclosure, by adopting the household appliance foot, automatic leveling is achieved. The installation is simple and convenient, and the whole-set vibration and noise of the household appliance are reduced.

REFERENCE SIGNS

100—household appliance foot, 101—hydraulic plate, 1011—port, 1012—first mounting hole, 1013—second mounting hole, 1014—hydraulic nozzle, 1015—anti-off bulge, 1016—third mounting hole, 1017—hydraulic plate groove, 102—hydraulic medium, 103—sheath, 1031—guiding limiting groove, 1032—mounting plane, 1033—stopping end part, 104—regulating foot, 1041—first guiding limiting block, 1042—second guiding limiting block, 105—rubber gasket, 106—pressing ring, 107—protective ring, 1071—embedding groove, 1072—protective curved surface, 108—flexible accommodation body, 1081—accommodating body, 200—hydraulic pipe, 300—throttling structure, 301—third throttling flow passage, 302—fourth throttling flow passage, 303—throttling hole, 400—communicating member, 401—groove, 402—sealing ring, 403—bolt, 404—pouring port, 500—throttling structure, 501—first throttling flow passage, 502—second throttling flow passage, and 503—throttling hole.

DETAILED DESCRIPTION OF THE EMBODIMENTS

A household appliance and a foot therefor, provided by the present disclosure, are described in detail as follows with reference to the accompanying drawings below.

Embodiment I

As shown in FIG. 1 to FIG. 8, a household appliance foot comprises:
a hydraulic plate 101;
a sheath 103, which is fixedly connected with the hydraulic plate 101;
a regulating foot 104, which is arranged in the sheath 103 and is axially movable relative to the sheath 103;
an accommodation chamber, which is formed by the hydraulic plate 101, the sheath 103 and the regulating foot 104; and
a hydraulic medium 102, which is arranged in the accommodation chamber and is compressed/expands depending on pressure changes to drive the regulating foot 104 to axially move in the sheath 103 for leveling.

According to the household appliance foot provided by the embodiment, based on the hydraulic principle, the regulating foot can perform adaptive regulation automatically because of the fluidity of the hydraulic medium due to different pressures resulting from unflatness, the hydraulic medium stops circulating until the household appliance foot achieves balance, and thus, automatic leveling is achieved.

According to the household appliance foot provided by the embodiment, a first mounting structure which is used for being fixedly connected with a bottom plate of a household appliance is arranged on the hydraulic plate 101; and a second mounting structure which is used for being fixedly connected with the sheath is arranged on the hydraulic plate.

According to the embodiment, the regulating foot 104 is axially movably sleeved in the sheath 103, and then the hydraulic plate 101 is fixedly connected with the sheath 103 through the second mounting structure, so that the independent assembly of the household appliance foot is achieved. The assembled household appliance foot is then integrally mounted on the bottom plate of the household appliance through the first mounting structure, and thus, the household appliance foot is mounted on the household appliance.

According to the embodiment, the assembling of the household appliance foot is achieved through the second mounting structures, the household appliance foot is mounted on the household appliance through the first mounting structures. And corresponding mounting is achieved through different mounting structures, so that the global stability of the household appliance foot is ensured, and the stability of mounting of the household appliance foot on the household appliance is also ensured.

In this embodiment, the hydraulic plate 101 of the household appliance foot is directly fixed to the bottom of the household appliance, the sheath 103 and the hydraulic plate 101 are fixedly connected. Thus, the hydraulic plate 101 is clamped by the bottom of the household appliance and the sheath 103. So that the strength of fixed connection between the hydraulic plate 101 and the sheath 103 is not necessary, a main purpose of connection between the hydraulic plate 101 and the sheath 103 is to form an integrated foot. And the strength of the connection is irrelevant to the size of gravity of the household appliance and the size of a supporting force of the regulating foot 104. Therefore, for the household appliance foot provided by the present disclosure, the hydraulic plate 101 and the sheath 103 can be rapidly, reliably and fixedly connected, the requirements on the strength of connection between the hydraulic plate 101 and the sheath 103 are lowered, and the essential space and height required by the connection are further lowered.

In summary, the household appliance foot provided by the embodiment is simpler in structure, simpler and more convenient in mounting, and has better stability.

In addition, with a structural design of the household appliance foot provided by the embodiment, the overall height of the household appliance foot can be further lowered, and thus, the household appliance foot has a better shock absorption effect on the household appliance. Taking a washing machine as an example, the household appliance foot provided by the present disclosure has a better shock absorption effect on dewatering vibration of the washing machine.

As a preferred implementation mode of the embodiment, the first mounting structures are first mounting holes 1013 formed in the hydraulic plate. And the hydraulic plate 101 is fixedly connected to the bottom plate of the household appliance in a manner that first connecting members pass through the first mounting holes 1013.

Concretely, in the embodiment, the first mounting holes 1013 are screw holes, the first connecting members are screws. The mounting holes for the screws to pass through are formed in the bottom plate of the household appliance, and the screws pass through the mounting holes in the bottom plate and are mounted to the screw holes in the hydraulic plate 101 to achieve fixed mounting.

Concretely, in the embodiment, the second mounting structures are second mounting holes 1012, and the hydraulic plate is fixedly connected with the sheath in a manner that second connecting members pass through the second mounting holes.

Further, in the embodiment, the upper end of the sheath 103 is flanged to form a mounting plane 1032, and the mounting plane 1032 is fit with the bottom surface of the hydraulic plate 101 and is fixedly connected with the bottom surface of the hydraulic plate 101. And fourth mounting holes corresponding to the second mounting holes 1012 are formed in the mounting plane 1032.

According to the embodiment, the mounting plane 1032 of the sheath 103 is fit with the hydraulic plate 101, thus, more pressure can be transferred to the mounting plane 1032 and is dispersed to prevent the hydraulic plate 101 from bearing too high pressure. Because liquid flow passages for circulation of the hydraulic medium are formed inside the hydraulic plate 101, the stability of the hydraulic plate 101 is a key to the stabilizing and leveling of the entire household appliance foot. According to the embodiment, the mounting plane 1032 is formed by the outward flanging of the upper end of the sheath 103, thus, the mounting contact area of the sheath 103 and the hydraulic plate 101 is increased, which facilitates the stability and dispersion of the hydraulic plate 101 transmitting force to the mounting plane 1032 of the sheath 103.

In addition, the mounting plane 1032 of the sheath 103 is fit with the hydraulic plate 101 and is fixedly connected with the hydraulic plate 101, avoiding mounting structures on the sheath 103 or hydraulic plate 101 and lowering the overall structure of the household appliance foot.

Further, in the embodiment, an outline of the mounting plane 1032 is matched with an outline of the hydraulic plate 101, and the mounting plane 1032 is fit with the bottom surface of the hydraulic plate 101 and is fixedly connected with the bottom surface of the hydraulic plate 101. Thus, a pressure applied to the hydraulic plate 101 can be better correspondingly transferred to the mounting plane 1032 of the sheath 103 to avoid stress concentration caused by the partial contact of the hydraulic plate 101 with the mounting plane 1032, which further facilitates the stable circulation of the hydraulic medium in the hydraulic plate.

Preferably, in the embodiment, the outline of the hydraulic plate 101 is similar to or the same as the outline of the mounting plane 1032. Thus, the mounting is simpler and more convenient through matching the hydraulic plate 101 and the mounting plane 1032.

Concretely, in the embodiment, the sheath 103 comprises a sleeve part having a hollow interior, and one end of the regulating foot 104 is sleeved in the sleeve part and is axially movable relatively. An upper end of the sleeve part is flanged to form the mounting plane 1032, and the mounting plane 1032 is fit with the bottom surface of the hydraulic plate 101 and is fixedly connected with the bottom surface of the hydraulic plate 101. According to the embodiment, the mounting plane 1032 is formed by the outward flanging of the upper end of the sleeve part, the regulating foot 104 axially moves in the sheath 103, and only the area of the mounting plane is enlarged, the whole of the sheath 103 is not enlarged. Thus, materials are saved, and the cost is reduced.

Concretely, in the embodiment, the hydraulic plate 101 is of a square flat-plate structure, the sleeve part is of a cylindrical structure. An upper end of the cylindrical structure flanges outward to form the square mounting plane 1032 which is matched with the hydraulic plate. And the square flat-plate structure is fit with the square mounting plane and is fixedly connected with the square mounting plane.

Concretely, in the embodiment, at least one second mounting structure is arranged at each of four corners of the hydraulic plate; and one first mounting structure is provided on at least one side of each second mounting structure;

preferably, one second mounting hole 1012 is formed at each of the four corners of the hydraulic plate 101, and the two sides of each second mounting hole 1012 are provided with a first mounting hole 1013.

In the embodiment, according to the structure and mounting characteristics of the household appliance foot, the first mounting holes 1013 are more than the second mounting holes 1012, so that the household appliance foot can be stably mounted on the household appliance. The first mounting holes 1013 are distributed at the two sides of the second mounting holes 1012, thus, the total weight of the household appliance can be more uniformly distributed on the hydraulic plate 101 to avoid the damage of the hydraulic plate caused by local stress concentration.

As a mounting mode of the embodiment, the sheath 103 and the hydraulic plate 101 can be fixedly connected by clamping, adhesive bonding, hot melt, or welding, and then fixedly mounted on the bottom of the household appliance.

According to the embodiment, the hydraulic plate 101 is made of plastics through integral injection molding or made of metal through die-casting. And the sheath 103 is made of plastics through integral injection molding or made of a metallic material through die-casting.

According to stress characteristics of the household appliance foot provided by the embodiment, preferably, the hydraulic plate 101 is made of plastics through integral injection molding. And the sheath 103 is made of metal through die-casting. Due to larger stress on the sheath 103, the sheath 103 is made of metal through die-casting to guarantee strength, thus, the household appliance foot provided by the embodiment is lower in manufacturing cost, and the overall strength of the household appliance foot can be guaranteed.

Partial gravity F1 of the household appliance is applied to the hydraulic plate 101 through the bottom plate. The plane of the hydraulic plate 101 can transmit the force to the mounting plane 1032 of the sheath 103. Stress of the interior of the hydraulic plate 101 is transferred to the regulating foot 104 through hydraulic pressure, the regulating foot 104 similarly bears a supporting force F2 from a supporting surface, and the F1 is equal to the F2. And stress of the regulating foot 104 is transferred to the plane of the hydraulic plate 101, and the stress is then transferred to the bottom plate of the household appliance by the hydraulic plate 101. By such a design, although the hydraulic plate 101 bears a pressure force of internal liquid flow passages, a partial gravity force of the washing machine and the supporting force of the regulating foot 104, the forces are all transferred to the mounting plane 1032 of the sheath 103, the regulating foot 104 and the bottom plate of the household appliance.

As a preferred implementation mode of the embodiment, the household appliance foot provided by the embodiment further comprises a flexible accommodation body 108 with a chamber therein, and the hydraulic medium is accommodated in the flexible accommodation body 108; and a third mounting structure which is used for mounting the flexible accommodation body 108 in a sealed manner is arranged on the hydraulic plate 101.

Concretely, the liquid flow passages are formed inside the hydraulic plate 101, the flexible accommodation body 108 has an opening part, and the opening part of the flexible accommodation body 108 is fixedly mounted on the bottom surface of the hydraulic plate 101 through a pressing ring 106 and communicates with the liquid flow passages. And the third mounting structures are third mounting holes 1016, and the pressing ring 106 is assembled on the third mounting holes 1016 through third connecting members.

Further, in the embodiment, the third mounting hole 1016 is disposed in the middle part of the hydraulic plate, and the third mounting hole includes at least four, corresponding to the four corners of the hydraulic plate 101.

As a preferred implementation mode of the embodiment, in the embodiment, the opening part of the flexible accommodation body 108 is fixedly mounted on the bottom surface of the hydraulic plate 101 through the pressing ring 106, and the pressing ring 106 and the hydraulic plate 101 jointly press the opening part to deform and seal. According to the embodiment, the pressing ring 106 is used for pressing the opening part to deform for sealing, so that the sealing is simpler and more convenient, and the sealing effect is good.

Further, the flexible accommodation body 108 comprises a small-diameter part, and one end part of the small-diameter part is flanged to form the opening part. The pressing ring 106 sleeves on the small-diameter part, the pressing ring 106 and the hydraulic plate 101 jointly press the opening part to deform and seal. According to the embodiment, during the sealed mounting of the flexible accommodation body 108, the small-diameter part can be firstly nested in the pressing ring 106, and only the pressing ring 106 is need to be fixedly mounted. In the process of fastening, the pressing ring 106 presses the opening part to achieve the sealed mounting.

As an implementation mode of the embodiment, a hydraulic plate groove is arranged at the bottom surface of the hydraulic plate 101, and the opening part of the flexible accommodation body 108 is deformed and filled into the hydraulic plate groove for sealing under pressure of the pressing ring 106. In this mode, sealing can be achieved through fastening the pressing ring 106 and pressing the opening part of the flexible accommodation body 108 to deform and fill into the hydraulic plate groove. The structure is simple, and the sealing is reliable and effective.

Preferably, a volume enclosed by the hydraulic plate groove and the pressing ring 106 is smaller than the volume of the opening part of the flexible accommodation body 108. Thus, the opening part of the flexible accommodation body 108 can be in tight contact with the hydraulic plate groove to ensure sealing performance.

According to the embodiment, the pressing ring 106 is fixed to the hydraulic plate 101 through fixing devices. And specifically the pressing ring 106 and the hydraulic plate 101 can be fixedly connected through bolts/screws. The pressing ring 106 is provided with a pressing ring mounting hole. And the bolts/screws pass through the pressing ring mounting holes and are fastened to the third mounting holes 1016 of the hydraulic plate 101.

According to the embodiment, the flexible accommodation body 108 comprises an accommodating body 1081. The accommodating body 1081 is of a soft capsular structure which has a telescopic corrugation structure. And the corrugation structure is arranged in the regulating foot 104 and extends and retracts depending on the flowing of the hydraulic medium to drive the regulating foot 104 to axially move in the sheath 103 for leveling.

The household appliance foot, provided by the embodiment, further comprises a protective member 107 for protecting the flexible accommodation body 108. The pressing ring 106 is embedded in the protective member 107, and then, technical effects as follows are achieved:

1. According to the embodiment, the pressing ring 106 and the protective ring 107 are mounted in an embedded manner so as to limit the position of pressing ring 106 and prevent the installation of a complicated limiting structure. And this limiting is simple and stable.

2. According to the household appliance foot provided by the embodiment, under extremely high impact pressure (for example, a household appliance or an object equipped with the household appliance foot falls off or is lifted and suddenly placed), as there is no gap between the protective ring 107 and the pressure exerted fitting surfaces of the flexible accommodation body 108, so that the flexible accommodation body 108 is prevented from problems such as expansion cracking resulting from gaps, and the reliability is improved.

3. According to the embodiment, the pressing ring 106 and the protective ring 107 are mounted in an embedded manner, and the mounting height of the pressing ring 106 and the protective ring 107 is lowered, so that the overall height of the household appliance foot is lowered. And the influence on the overall center of gravity of the household appliance caused by mounting the household appliance foot on the household appliance is less, the stability of supporting of the household appliance is better facilitated, and the shock absorption effect on vibration of the household appliance during working (for example, dewatering vibration of the washing machine) is better.

As a preferred implementation mode of the embodiment, a protective curved surface 1072 is arranged at one end of the protective ring 107 and is matched with an outside surface of the flexible accommodation body 108 to prevent the flexible accommodation body 108 from being broken under pressure.

According to the embodiment, an embedding groove 1071 is formed in the other end of the protective ring 107, and the pressing ring 106 is embedded in the embedding groove 1071 of the protective ring 107.

As a preferred implementation mode of the embodiment, a limiting convex portion is formed on the internal wall of the embedding groove 1071 of the protective ring 107, and a limiting concave portion matched with the limiting convex portion is formed on a fixing member. According to the embodiment, a limiting structure is designed according to the embedded mounting of the pressing ring 106 and the protective ring 107, and limiting motion is achieved while carrying out embedded mounting. And thus, the structure is simple, stable and reliable.

According to the embodiment, the depth of the embedding groove 1071 is greater than the thickness of the pressing ring 106, thus, the pressing ring 106 can be completely embedded into the embedding groove 1071, and the mounting height is lowered to the maximum to lower the overall height of the household appliance foot. Meanwhile, when the household appliance foot is in an out-of-flat state, each flexible accommodation body 108 bears different pressure forces, the hydraulic medium flows, and the flexible accommodation body 108 extends and retracts to drive the regulating foot 104 to axially move in the sheath 103 for leveling. The extending and retracting of the flexible accommodation body 108 inevitably acts on the protective ring 107, and the protective ring 107 axially moves under the embedded limiting of the embedding groove 1071 and the pressing ring 106.

In the embodiment, the circumference of the protective ring 107 completely wraps the pressing ring 106, and the protective ring 107 is pressed into the regulating foot 104, and thus, the reliability and the stability of fitting are greatly improved. Therefore, after the protective ring 107 is pressed into the regulating foot 104, the protective ring 107 will always axially move in the regulating foot 104 stably, and the moving is smooth and reliable. The entire household appliance foot can be more stable because of the protective ring 107 and the regulating foot 104, and both the protective ring 107 and the pressing ring 106 can have a certain amount of activity up and down.

According to the household appliance foot provided by the embodiment, the sheath 103 and/or the regulating foot 104 are provided with a guiding limiting mechanism which is used for limiting the circumferential rotation of the regulating foot 104 relative to the sheath 103. And a port 1011 corresponding to the guiding limiting mechanisms is arranged in the hydraulic plate 101.

According to the household appliance foot provided by the embodiment, the household appliance is automatically leveled by using the hydraulic principle, and the leveling is simple and reliable. And the regulating foot 104 is arranged in the sheath 103 in a manner of being capable of axially moving relative to the sheath 103, and the regulation on the household appliance is only limited to a vertical direction, so that in order to guarantee the stability of leveling, the rotation of the regulating foot 104 relative to the sheath 103 is need to be limited. Therefore, the guiding limiting mechanisms are used for limiting the regulating foot 104 to move along a required direction relative to the sheath 103.

As the household appliance (for example, a washing machine) generally will generate vibration during working, in order to guarantee the stability of running of the household appliance, the overall height of the household appliance foot provided by the embodiment should be lowered as far as possible to lower the center of gravity of the household appliance. Therefore, the ports 1011 are formed in the hydraulic plate 101 corresponding to the guiding limiting mechanisms. While meeting the setting of the guide limiting mechanism, it does not affect the axial movement of the regulating foot 104, so as to reduce the overall height of the household appliance foot and improve the damping stability. Concretely, the guiding limiting mechanisms comprise a guiding limiting groove/a guiding limiting convex portion arranged on the internal wall of the sheath and a guiding limiting convex portion/a guiding limiting groove correspondingly arranged on the external wall of the regulating foot. And the guiding limiting convex portions are arranged in the guiding limiting grooves in a relatively slidable manner to limit the circumferential rotation of the regulating foot relative to the sheath. According to the embodiment, the axial moving of the regulating foot 104 can be limited through the cooperation of the guiding limiting grooves and the guiding limiting convex portions, and thus, the structure is simple and reliable.

According to the embodiment, the ports 1011 are arranged corresponding to the guiding limiting convex portions/guiding limiting grooves of the regulating foot 104, and the regulating foot 104 moves towards the hydraulic plate 101. One end of each guiding limiting convex portion/guiding limiting groove of the regulating foot 104 enters into one corresponding port 1011. According to the embodiment, in view of the axial moving of the regulating foot 104, only the yielding parts are need to be arranged corresponding to the guiding limiting convex portions/guiding limiting grooves of the regulating foot 104 regardless of the type of the guiding limiting mechanisms. So that, on the premise of not changing regulating height, the overall height of the household appliance foot is lowered, and the stability of guiding and limiting is guaranteed.

As a preferred implementation mode of the embodiment, guiding limiting grooves 1031 are formed in the internal wall of the sheath 103 along an axial direction of the sheath 103. The guiding limiting convex portions are arranged on the external wall of the regulating foot 104, and the guiding limiting convex portion is relatively slidably disposed in the guiding limiting groove 1031 to limit the circumferential rotation of the regulating foot 104 relative to the sheath 103.

According to the embodiment, the ports 1011 are formed in the hydraulic plate 101 corresponding to the guiding limiting convex portions. The regulating foot 104 axially moves up and down in the sheath 103, and one end of each guiding limiting convex portion goes into/out of one corresponding port 1011.

Therefore, according to the household appliance foot provided by the embodiment, one end of each guiding limiting convex portion goes into/out of to one corresponding port 1011, so that a greater regulating height is achieved under the condition of the same overall height. And under the condition of the same regulating height, the household appliance foot provided by the embodiment has a smaller overall height.

As a preferred implementation mode of the embodiment, each guiding limiting convex portion comprises a first guiding limiting block 1041 and a second guiding limiting block 1042. The first guiding limiting blocks 1041 are fixed to the external wall of the regulating foot 104, and the second guiding limiting blocks 1042 are fixed to the first guiding limiting blocks 1041 and extend by a certain height towards the hydraulic plate 101. According to the embodiment, the first guiding limiting blocks 1041 mainly play roles in carrying out guiding and limiting in the guiding limiting grooves 1031, and the second guiding limiting blocks 1042 prolong the first guiding limiting blocks 1041. And thus, the stability of guiding and limiting is better.

As a preferred implementation mode of the embodiment, a plurality of guiding limiting mechanisms are distributed along circumferential directions of the sheath 103 and/or the regulating foot 104. And a plurality of ports 1011 are formed in the hydraulic plate 101 corresponding to the guiding limiting mechanisms. By setting a plurality of guiding limiting mechanisms, the stability of limiting is further improved, and the effect of guiding and limiting is better.

According to the embodiment, in order to achieve the up-and-down movement of the regulating foot 104 in the sheath 103 and prevent circumferential rotation, a certain quantity of guiding limiting grooves 1031 are formed in the circumference of the sheath 103, and the quantity is N which is greater than or equal to 1. In a graphic illustration of the present disclosure, N is 4 preferably.

Correspondingly, guiding limiting convex portions are arranged on the circumference of the regulating foot 104, and the quantity of the guiding limiting convex portions is N which is greater than or equal to 1. In a graphic illustration of the present disclosure, N is 4 preferably. The guiding limiting convex portions can move in the guiding limiting grooves and are limited by stopping end parts 1032 in bottom of the guiding limiting grooves 1031 to prevent the regulating foot 104 from falling off from the sheath 103.

In order to lower the height of the household appliance foot as far as possible and achieve better stability, the height of a sheath 200 and the height of a regulating foot 300 can be reduced as far as possible in principle, particularly the height of a superposed part, i.e. H1 in a graphic illustration, under the condition of not lowering a regulating height H0. When H1 is very small, the limiting function of the sheath 200 to the regulating foot 300 will be lowered, and the problems such as biasing of the regulating foot 300 are caused.

Embodiment II

As shown in FIG. 1 to FIG. 8, FIG. 20 and FIG. 21, a household appliance foot in the embodiment comprises:

a hydraulic plate 101;

a sheath 103, which is fixedly connected with the hydraulic plate 101;

a regulating foot 104, which is arranged in the sheath 103 and is axially movable relative to the sheath 103;

an accommodation chamber, which is formed by the hydraulic plate 101, the sheath 103 and the regulating foot 104; and a hydraulic medium 102, which is arranged in the accommodation chamber and is compressed/expands depending on pressure changes to drive the regulating foot to axially move in the sheath for leveling.

An overall height h and a transverse length D of the household appliance foot are determined by specification parameters of a mounted household appliance.

According to the household appliance foot, provided by the embodiment, based on the hydraulic principle, the regulating foot can perform adaptive regulation automatically because of the fluidity of the hydraulic medium due to different pressures resulting from unflatness, the hydraulic medium stops circulating until the household appliance foot achieves balance, and thus, automatic leveling is achieved.

According to a large quantity of practice results, it can be seen that the household appliance leveling effect of the household appliance foot provided by the embodiment depends on two parameters, i.e. the overall height h and the transverse length D, to a great extent. With a lower overall height h, the overall center of gravity of the household appliance can be effectively lowered, and the leveling effect is better. With a greater transverse length D, the stability of supporting of the household appliance can be improved, and the leveling effect is better. And with a greater transverse length D, the volume of the accommodation chamber formed by the hydraulic plate 101, the sheath 103 and the regulating foot 104 can be increased simultaneously to accommodate more hydraulic medium, and the leveling effect is better. However, it is not always the case that the greater the overall height h and the transverse length D of the household appliance foot are, the better the leveling effect is, the leveling effect also depends on factors such as manufacturing, mounting and cost. Therefore, the overall height h and the transverse length D of the household appliance foot provided by the embodiment are determined by the specification parameters of the mounted household appliance, and the optimal overall height h and the optimal transverse length D are determined by the specification parameters of the household appliance.

Proven by further researches, the regulating effect of the household appliance foot provided by the embodiment depends on a h/D ratio of the overall height h to the transverse length D. Concretely, the overall height h and the transverse length D of the household appliance foot and a weight m of the household appliance have a relationship: h/D is inversely proportional to m.

As a preferred implementation mode of the embodiment, the overall height h and the transverse length D of the household appliance foot meet that: 0<h/D≤10;

preferably, 0.1≤h/D≤0.1; and more preferably, 0.4≤h/D≤0.8.

The range of h/D, defined in the embodiment, of the household appliance foot can meet the leveling requirements of 96% household appliances, and the household appliance foot has a better leveling effect, is convenient to manufacture and mount and is lower in cost. Therefore, the household appliance foot, produced according to the h/D range in the embodiment, can be applied to every household appliance as a standard element, and is more conducive to marketing.

As a preferred implementation mode of the embodiment, the overall height h of the household appliance foot provided by the embodiment is a sum of the height of the regulating foot and the height of the sheath when the regulating foot completely stretches out from the sheath;

preferably, the overall height h of the household appliance foot meets that: 5 mm≤h≤100 mm; and further preferably, the overall height h of the household appliance foot is 25±15 mm.

The range of overall height h, defined in the embodiment, of the household appliance foot can meet the leveling requirements of 96% household appliances, and the household appliance foot has a better leveling effect, is convenient to manufacture and mount and is lower in cost.

As a preferred implementation mode of the embodiment, a main body of the sheath 103 is of a cylindrical structure, and the regulating foot 104 is sleeved in the cylindrical structure and is axially movable. The transverse length D of the household appliance foot is a diameter of the sheath;

preferably, the transverse length D of the household appliance foot meets that: 5 mm≤D≤590 mm; and further preferably, the transverse length D of the household appliance foot is 50±30 mm.

The range of transverse length D, defined in the embodiment, of the household appliance foot can meet the leveling requirements of 96% household appliances, and the household appliance foot has a better leveling effect, is convenient to manufacture and mount and is lower in cost.

Further, in the embodiment, the regulating foot 104 is of a cylindrical structure, and the diameter of the regulating foot 104 is d which meets that: 5 mm≤d≤590 mm; and preferably, the diameter of the regulating foot 104 is d which is 50±30 mm.

According to the embodiment, due to the value range of the diameter d of the regulating foot 104, better supporting stability can be provided.

As a preferred implementation mode of the embodiment, at least two household appliance feet communicate with each other through hydraulic pipes so as to allow the hydraulic medium to circulate between the household appliance feet; and a diameter of each hydraulic pipe is d1 and meets that: 0.5 mm≤d1≤h; and preferably, the diameter d1 of each hydraulic pipe is 10±9 mm.

According to the embodiment, because of the diameter d1 of the hydraulic pipes, the flow velocity of the hydraulic medium can be reduced, and thus, the stability of regulating is better. In addition, in view of the condition that the household appliance is suddenly stressed, better buffering can be achieved, and the damage to the household appliance feet is prevented, and the service life of each household appliance foot is prolonged.

According to the embodiment, the two household appliance feet communicate with each other through a hydraulic pipe to form a household appliance foot group, and the overall length of the household appliance foot group is not smaller than the width of the household appliance.

As a preferred implementation mode of the embodiment, the household appliance is a washing machine, and the overall height h and the transverse length D of the household appliance foot and a capacity V of the washing machine have a relationship: h/D is inversely proportional to the V. In view of the washing machine, the stability of supporting is mainly affected by weight, and the weight mainly depends on the capacity V of the washing machine.

The range of parameters, defined in the embodiment, of the household appliance foot can meet the leveling requirements of household appliances, and the household appliance foot has a better leveling effect, is convenient to manufacture and mount and is lower in cost. Therefore, the household appliance foot provided by the embodiment can be applied to every household appliance as a standard element, and is more conducive to marketing.

Embodiment III

As shown in FIG. 9 to FIG. 13, a household appliance foot in the embodiment comprises:

a hydraulic plate 101;

a sheath 103, which is fixedly connected with the hydraulic plate 101;

a regulating foot 104, which is arranged in the sheath 103 and is axially movable relative to the sheath 103;

an accommodation chamber, which is formed by the hydraulic plate 101, the sheath 103 and the regulating foot 104;

a hydraulic medium, which is arranged in the accommodation chamber and is compressed/expands depending on pressure changes to drive the regulating foot 104 to axially move in the sheath 103 for leveling; and throttling structures 500, which are arranged in the hydraulic plate 101 for slowing down a flow velocity of the hydraulic medium.

According to the household appliance foot provided by the embodiment, based on the hydraulic principle, the regulating foot can perform adaptive regulation automatically because of the fluidity of the hydraulic medium due to different pressures resulting from unflatness, the hydraulic medium stops circulating until the household appliance foot achieves balance, and thus, automatic leveling is achieved.

According to the household appliance foot provided by the embodiment, the throttling structures 500 are arranged in the hydraulic plate, so that the rapid flowing of the hydraulic medium is prevented, and a regulating process can be more stable. In addition, in view of the condition that pressure of the household appliance foot changes greatly, the throttling structures 500 can cushion well to avoid the damage of the household appliance foot caused by the sudden rapid flowing of the hydraulic medium.

As an implementation mode of the embodiment, the throttling structures 500 are throttling flow passages arranged in the hydraulic plate, and the throttling flow passages allows the flowing damping force of the hydraulic medium to increase for reducing the flow velocity of the hydraulic medium.

Figure 1:
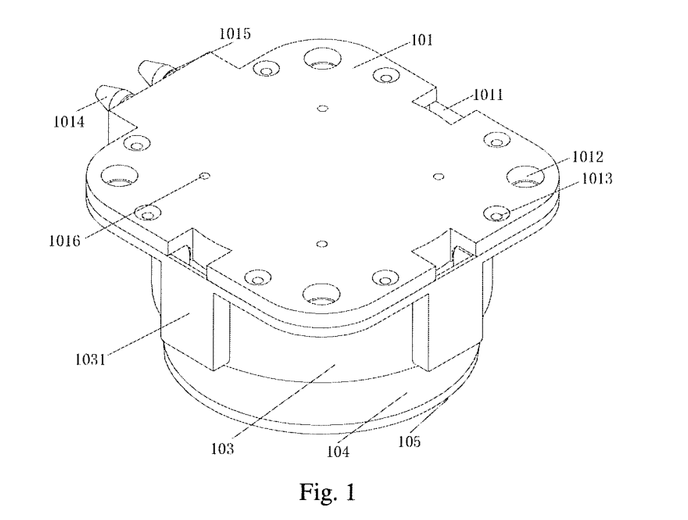
FIG. 1 is a stereoscopic schematic diagram of a household appliance foot according to embodiment I of the present disclosure.
Figure 2:
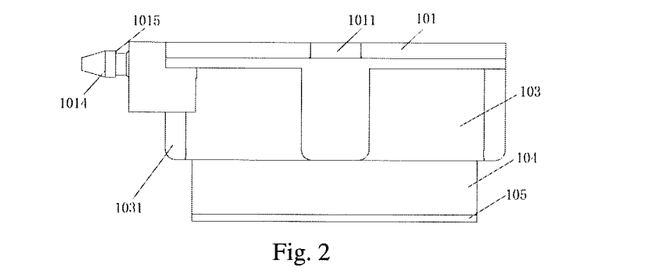
FIG. 2 is a front view of the household appliance foot according to embodiment I of the present disclosure.
Figure 3:
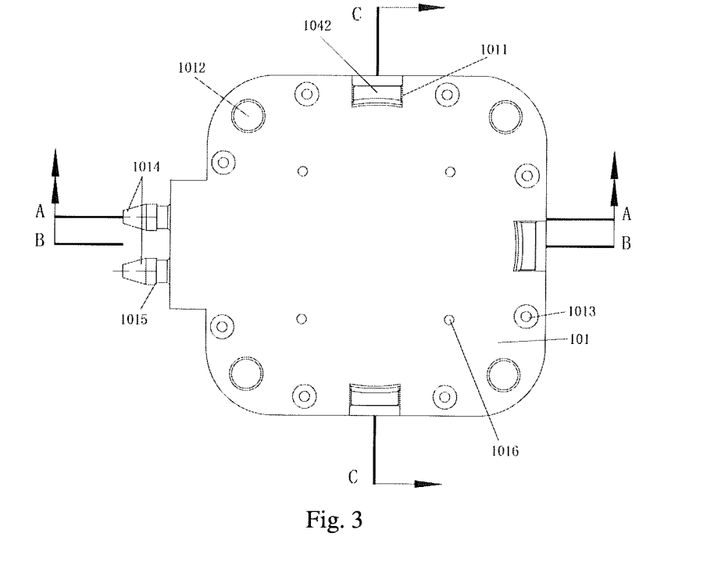
FIG. 3 is a top view of the household appliance foot according to embodiment I of the present disclosure.
Figure 4:
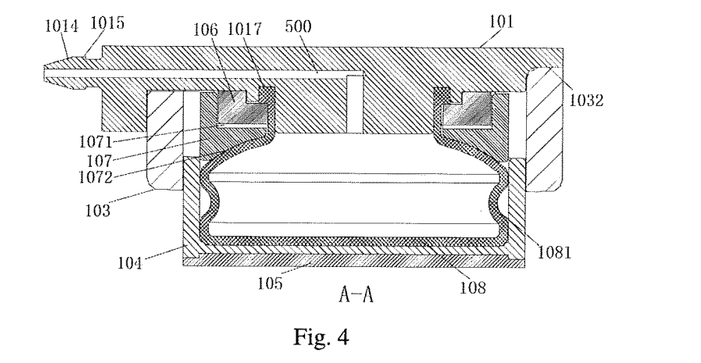
FIG. 4 is a section view of the household appliance foot according to embodiment I of the present disclosure taken along section A-A in the FIG. 3.
Figure 5:
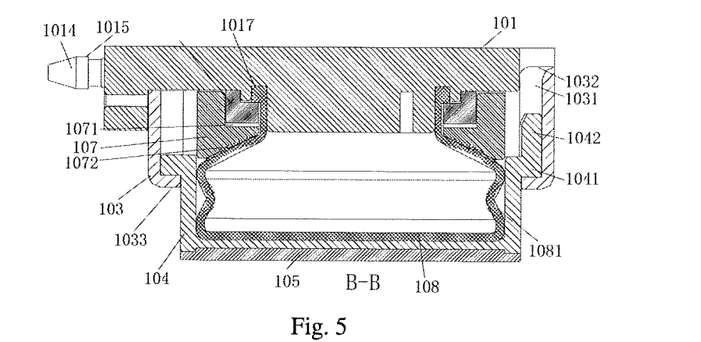
FIG. 5 is a section view of the household appliance foot according to embodiment I of the present disclosure taken along section B-B in the FIG. 3.
Figure 6:
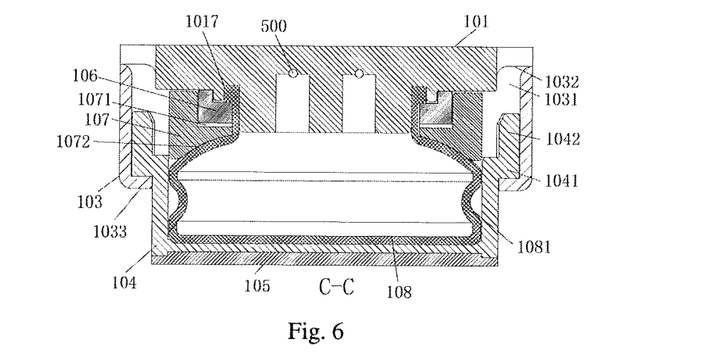
FIG. 6 is a section view of the household appliance foot according to embodiment I of the present disclosure taken along section C-C in the FIG. 3.
Figure 7:
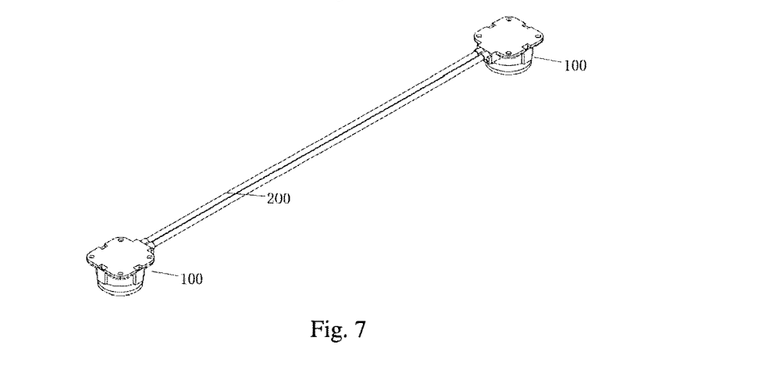
FIG. 7 is a schematic diagram of a combination mode I of the household appliance feet according to embodiment I of the present disclosure.
Figure 8:
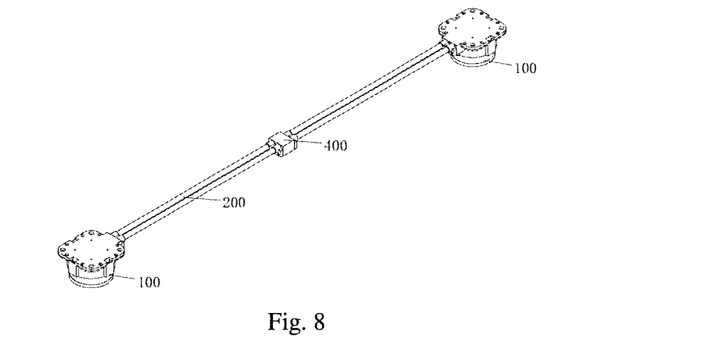
FIG. 8 is a schematic diagram of a combination mode II of the household appliance feet according to embodiment I of the present disclosure.
Figure 9:
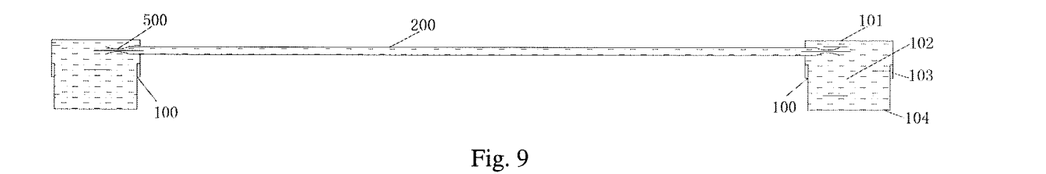
FIG. 9 is an operating-principle schematic diagram of a household appliance foot according to embodiment II of the present disclosure.
Figure 10:
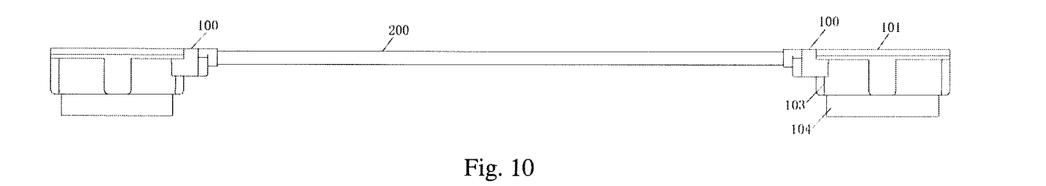
FIG. 10 is a structural schematic diagram of a household appliance foot group according to embodiment II of the present disclosure.
Figure 11:
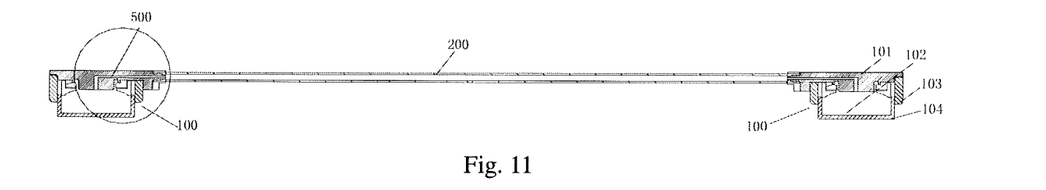
FIG. 11 is a section view of the household appliance foot group according to embodiment II of the present disclosure.
Figure 12:
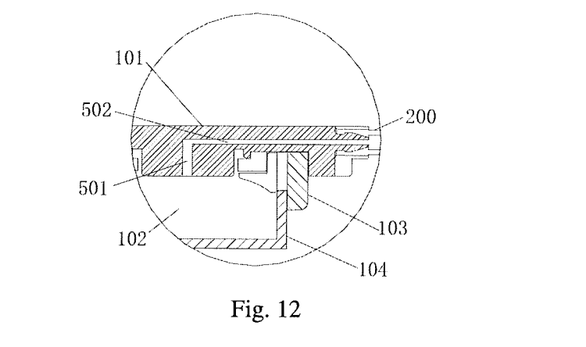
FIG. 12 is a local enlarged view of an implementation mode I of a throttling structure of the household appliance foot according to embodiment II of the present disclosure.

Referring to FIG. 12, concretely, hydraulic nozzles 1014 are arranged on the hydraulic plate 101 for allowing the hydraulic medium flowing out. And each throttling flow passage comprises a first throttling flow passage 501 and a second throttling flow passage 502. One end of the first throttling flow passage 501 communicates with the accommodation chamber, the other end of the first throttling flow passage 501 communicates with the second throttling flow passage 502, and the second throttling flow passage 502 communicates with a hydraulic nozzle 1014.

As a preferred implementation mode of the embodiment, the diameter of each first throttling flow passage 501 is greater than that of each second throttling flow passage 502.

Figure 13:
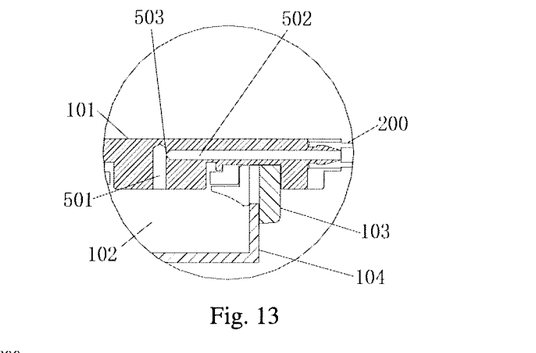
FIG. 13 is a local enlarged view of an implementation mode II of a throttling structure of the household appliance foot according to embodiment II of the present disclosure.
Figure 14:
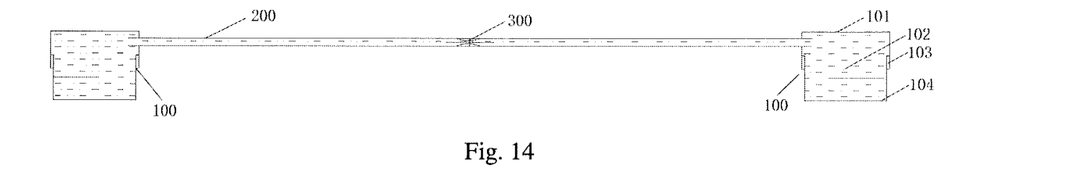
FIG. 14 is an operating-principle schematic diagram of a household appliance foot according to embodiment III of the present disclosure.
Figure 15:
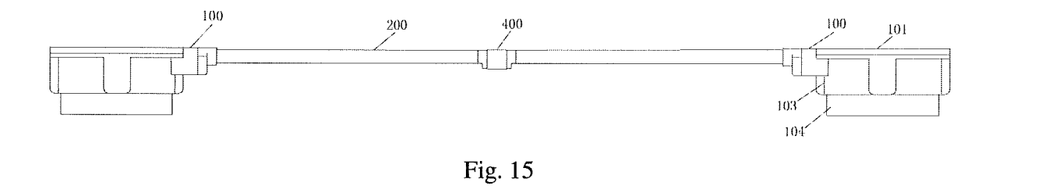
FIG. 15 is a structural schematic diagram of a household appliance foot group according to embodiment III of the present disclosure.
Figure 16:
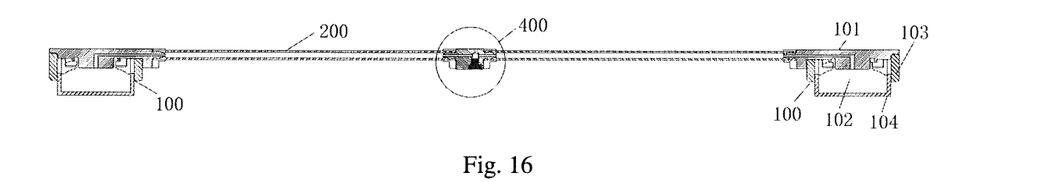
FIG. 16 is a section view of the household appliance foot group according to embodiment III of the present disclosure.

Referring to FIG. 13, as a preferred implementation mode of the embodiment, throttling holes 503 are formed at connecting positions of the first throttling flow passages 501 and the second throttling flow passages 502, and the diameter of each throttling hole is smaller than that of each of the first throttling flow passages and the second throttling flow passages.

The thickness of the hydraulic plate 101 is relatively small, so that a production process for forming the throttling flow passages, particularly throttling flow passages with greater length and smaller diameter, inside the hydraulic plate 101 is difficult. That will result in production difficulty, complicated process, high cost and low productivity. In this mode, throttling is achieved by a throttling hole, thus, the restriction on diameters of the throttling flow passages is less, and the diameters of the throttling flow passages can be relatively greater. The production is easy, and the throttling effect is weakened. However, the throttling effect at the throttling holes is relatively obvious.

Therefore, according to the household appliance foot provided by the embodiment, throttling is achieved by throttling holes. Thus, the production process is simple, the throttling effect is good, and the hydraulic foot is more stable and reliable.

Concretely, in the embodiment, an end of the first throttling flow passage 501 forms a throttling hole, and the end is in communication with the second throttling flow passage 502, and is reduced in diameter;

or, an end of the second throttling flow passage 502 forms a throttling hole, and the end communicates with the first throttling flow passage 501, and is reduced in diameter.

In order to achieve the throttling effect, in the embodiment, a minimum diameter d of the throttling flow passage meets that: $d \leq 6$ mm; preferably $d \leq 2$ mm; and further preferably $d \leq 1$ mm.

Concretely, the diameter of the second throttling flow passage 502 is the minimum diameter d, or, the aperture of the throttling holes is the minimum diameter d.

As a preferred implementation mode of the embodiment, liquid flow passages for allowing the hydraulic medium to flow therein are formed in the hydraulic plate 101, and the throttling structures 500 are arranged in the liquid flow passages to allow the flowing damping force of the hydraulic medium to increase for reducing the flow velocity of the hydraulic medium. In this case, the throttling structures may be a structure such as a baffle ring or a baffle block fixed in the liquid flow passages to reduce inner diameters of the liquid flow passages.

The household appliance foot provided by the embodiment further comprises a flexible accommodation body with a chamber therein. And the hydraulic medium is accommodated in the flexible accommodation body. The flexible accommodation body has an opening part, and the opening part of the flexible accommodation body is fixedly mounted on the hydraulic plate and communicates with the throttling flow passages or the liquid flow passages.

According to the household appliance foot provided by the embodiment, the throttling structures can also play a role in stabilizing pressure. For example, when a washing machine sways during washing or dewatering or a load to the foot changes, after the hydraulic medium passes through the throttling structures, the hydraulic pressure and flow velocity are lowered. During the working procedure of the washing machine, the fluctuation of the hydraulic pressure is relatively small, which will not cause the movement of the regulating foot to be too large due to the fluctuation of the hydraulic pressure. Then, the stability of the washing machine can be effectively and automatically regulated, and the vibration and noise of the washing machine are further reduced.

Embodiment IV

As shown in FIG. 14 to FIG. 19, a household appliance foot in the embodiment comprises:

a hydraulic plate 101;

a sheath 103, which is fixedly connected with the hydraulic plate 101;

a regulating foot 104, which is arranged in the sheath 103 and is axially movable relative to the sheath 103;

an accommodation chamber, which is formed by the hydraulic plate 101, the sheath 103 and the regulating foot 104;

a hydraulic medium, which is in the accommodation chamber and is compressed or expands depending on pressure changes to drive the regulating foot 104 to axially move in the sheath 103 for leveling;

a communicating device, which communicates at least two household appliance feet to achieve the circulation of the hydraulic medium between the household appliance feet; and a throttling structure 300, which is arranged in the communicating device for slowing down a flow velocity of the hydraulic medium.

According to the household appliance foot provided by the embodiment, based on the hydraulic principle, the regulating foot can perform adaptive regulation automatically because of the fluidity of the hydraulic medium due to different pressures resulting from unflatness. The hydraulic medium stops circulating until the household appliance foot achieves balance, and thus, automatic leveling is achieved.

The household appliance feet provided by the embodiment communicate with each other through the communicating devices, thus, the hydraulic medium can flow among the household appliance feet to achieve automatic leveling. According to the embodiment, the throttling structures 300 are arranged in the communicating devices, so that the rapid flowing of the hydraulic medium among the household appliance feet is prevented, and a regulating process can be more stable. In addition, in view of the condition that pressure of the household appliance feet changes greatly, the throttling structures 300 can cushion well to avoid the damage of the household appliance feet caused by the sudden and rapid flowing of the hydraulic medium.

As an implementation mode of the embodiment, the communicating device comprise a hydraulic pipe 200 and a communicating member 400, and at least two household appliance feet are communicated with the same communicating member 400 through a hydraulic pipe 200 respectively to achieve communicating. The throttling structures 300 are arranged in the communicating members 400. If the hydraulic pipes 200 are too thin, diameters of hydraulic nozzles connected with the hydraulic pipes 200 will also be very small, and the strength of the hydraulic nozzles cannot easily meet requirements in case of too small diameters. Therefore, in this embodiment, the throttling structure 300 is arranged in the communicating member 400 to be easier to manufacture and reduce the cost.

Concretely, in the embodiment, the throttling flow passage is arranged in the communicating member 400, both ends of each throttling flow passage separately communicate with one corresponding hydraulic pipe 200. So that the flowing damping force of the hydraulic medium is allowed to increase by the throttling flow passage for reducing the flow velocity of the hydraulic medium.

According to the embodiment, the diameter of the throttling flow passage is smaller than that of hydraulic pipe 200 communicated with the throttling flow passage; or, each throttling flow passage comprises a diameter-reduced part to form one throttling hole 303.

Figure 17:
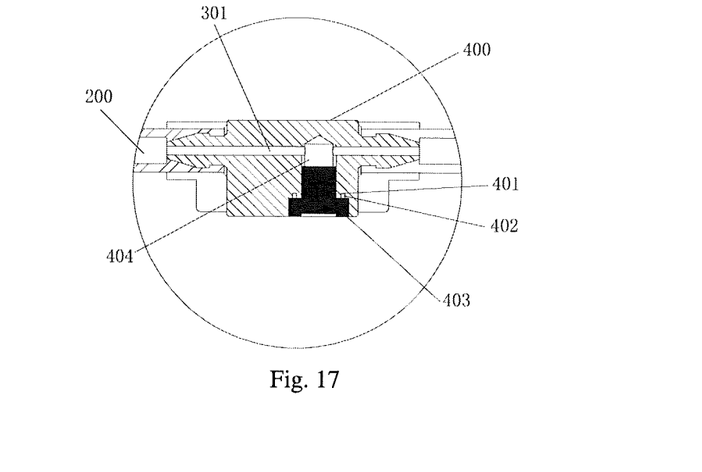
FIG. 17 is a local enlarged view of an implementation mode I of a throttling structure of the household appliance foot according to embodiment III of the present disclosure.

Concretely, as shown in FIG. 17, a third throttling flow passage 301 is arranged in the communicating member 400. The two ends of the third throttling flow passage 301 respectively pass through two hydraulic nozzles which are used for being connected with corresponding hydraulic pipes 200. The inner diameter of the third throttling flow passages 301 is far smaller than that of the hydraulic pipes 200, to achieve a throttling effect.

Figure 18:
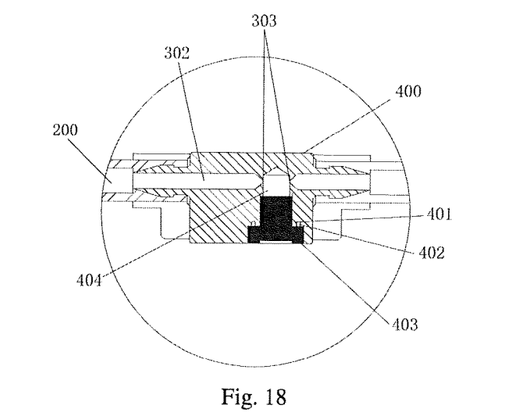
FIG. 18 is a local enlarged view of an implementation mode II of a throttling structure of the household appliance foot according to embodiment III of the present disclosure.
Figure 19:
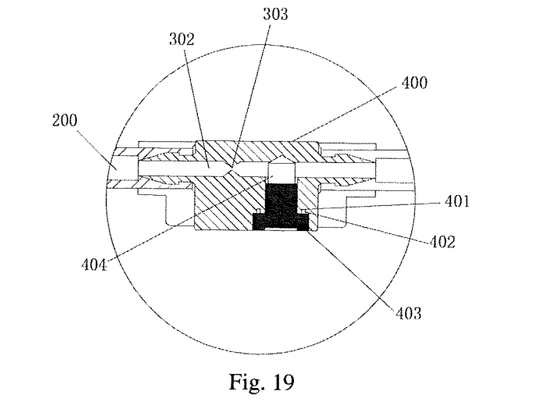
FIG. 19 is a local enlarged view of an implementation mode III of a throttling structure of the household appliance foot according to embodiment III of the present disclosure.
Figure 20:
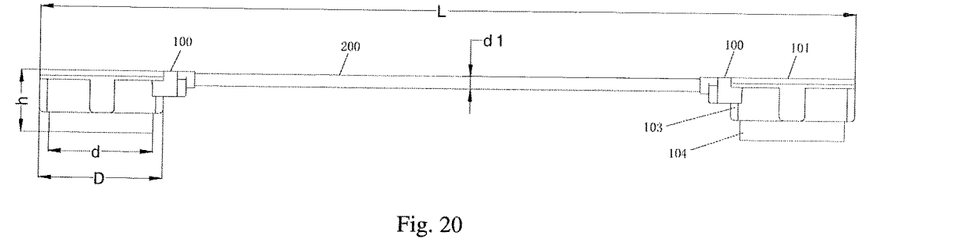
FIG. 20 is a structural schematic diagram of a household appliance foot group according to embodiment IV of the present disclosure.
Figure 21:
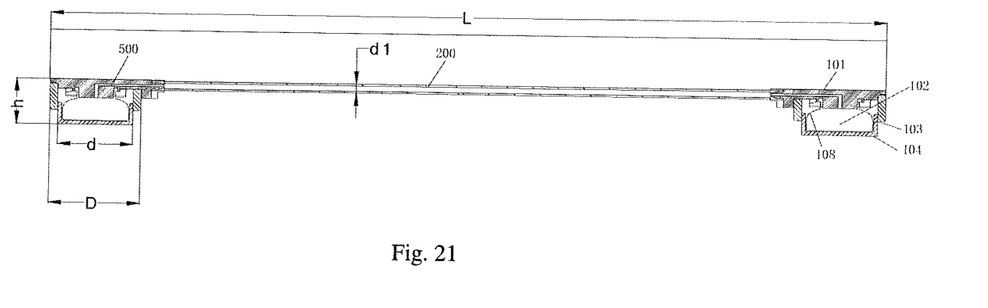
FIG. 21 is a section view of the household appliance foot group according to embodiment IV of the present disclosure.

Or, as shown in FIG. 18 and FIG. 19, a fourth throttling flow passage 302 is arranged in the communicating member 400. Two ends of the fourth throttling flow passage 302 respectively pass through two hydraulic nozzles which are used for being communicated with corresponding hydraulic pipes 200. The inner diameter of the fourth throttling flow passage 302 is slightly smaller than that of the hydraulic pipes 200. The fourth throttling flow passage 302 comprises a diameter-reduced part to form one throttling hole 303.

A production process for forming the throttling flow passages, particularly throttling flow passages with greater length and smaller diameter, in the communicating members 400 is difficult. Thus, the problems such as production difficulty, complicated process, high cost and low production efficiency will be caused. According to the mode, throttling is achieved by a throttling hole, thus, the restriction on diameters of the throttling flow passages is lesser. The diameters of the throttling flow passages can be relatively greater to be easier to manufacture, and the throttling effect is weakened. However, the throttling effect at the throttling holes is relatively obvious.

Further, a pouring port 404 which is used for pouring the hydraulic medium is arranged in the communicating members 400. A sealing device is mounted on the pouring port 404 in a sealing manner. And the throttling flow passages pass through the pouring ports.

As shown in FIG. 18, the diameter of the throttling flow passage at a position connected with the pouring ports is reduced to form the throttling holes 303.

Or, as shown in FIG. 19, diameters of a middle part of the throttling flow passages located at one side of the pouring port 404 is reduced to form the throttling hole 303.

As a preferred implementation mode of the embodiment, the pouring port 404 is a screw hole, and the sealing device comprises a bolt 403 and a sealing ring 402. The bolt 403 is mounted in the screw hole 404, and the sealing ring 402 is arranged between the bolt 403 and the screw hole for sealing connection.

According to the embodiment, the pouring ports are of counterbore structures, grooves 401 are formed in opening ends of the counterbore structures, and the sealing rings 402 are arranged in the grooves 401.

Preferably, in the embodiment, a minimum diameter d of the throttling flow passages meets that: $d \leq 6$ mm; preferably $d \leq 2$ mm; and further preferably $d \leq 1$ mm.

As an implementation mode of the embodiment, the hydraulic nozzles are arranged on the hydraulic plate for allowing the hydraulic medium to flow out. The two household appliance feet communicate with each other through one hydraulic pipe. And the diameter of the hydraulic pipe is smaller than that of the hydraulic nozzle. And thus, a flowing damping force of the hydraulic medium is increased to reduce the flow velocity of the hydraulic medium. According to the embodiment, the object of throttling can also be achieved through reducing the diameter of the hydraulic pipe.

As an implementation mode of the embodiment, liquid flow passages for flowing of the hydraulic medium are formed in the communicating devices 400. The throttling structures are arranged in the liquid flow passages to allow the flowing damping force of the hydraulic medium to increase for reducing the flow velocity of the hydraulic medium. In this case, the throttling structures may be structures such as baffle rings or baffle blocks fixed in the liquid flow passages to reduce inner diameters of the liquid flow passages.

Embodiment V

The household appliance foot, provided by the embodiment, comprises a hydraulic plate 101, which is internally provided with a throttling flow passage; a sheath 103, which is fixedly connected with the hydraulic plate 101; a regulating foot 104, which is arranged in the sheath 103 and is axially movable relative to the sheath 103; an accommodation chamber, which is formed by the hydraulic plate 101, the sheath 103 and the regulating foot 104; and a flexible accommodation body 108, which accommodates a hydraulic medium and is arranged in the accommodation chamber. The flexible accommodation body 108 extends and retracts to drive the regulating foot 104 to axially move in the sheath 103 for leveling under the action of pressure. The household appliance foot further comprises a rubber gasket 105 which is fixed to the bottom of the regulating foot 104. The bottom of the rubber gasket 105 has designed patterns, thus, the friction force to the ground is increased, and the stability is enhanced.

Embodiment VI

The embodiment also provides a household appliance with the household appliance foot provided by any one of the above-mentioned embodiments. The household appliance comprises a casing, and a plurality of household appliance feet are mounted at the bottom of the casing. And a hydraulic medium filled in the household appliance feet 100 can flow among the household appliance feet for leveling.

Preferably, at least two household appliance feet 100 communicate with each other through communicating devices to achieve the flowing of the hydraulic medium among the household appliance feet.

According to the embodiment of the present disclosure, taking a washing machine for example, a principle and a method for automatic leveling of the washing machine by using the household appliance foot provided by the present disclosure are elaborated. After the washing machine is mounted, different household appliance feet are different in horizontal height due to an out-of-flat ground surface, and the household appliance feet located at pits of the ground surface are low in position. Thus, the household appliance feet at high positions firstly bear the weight of the washing machine and bear a large gravity force, and the household appliance feet at low positions bear a smaller gravity force or failure of support problem.

Regulating feet of the household appliance feet at high positions move up under high pressure, and heights of the entire feet are reduced, thus, volumes of hollow chambers of flexible accommodation bodies full of the hydraulic medium are compressed and reduced. The hydraulic medium is forced to enter throttling holes or valve holes and enter into the household appliance feet at low positions through high-pressure pipes. Thus, the hydraulic medium in flexible accommodation bodies of the household appliance feet at low positions becomes more and more, and the flexible accommodation bodies are expanded to promote the stretching of the regulating foots.

When the feet at high positions and the feet at low positions are the same in hydraulic pressure, the hydraulic medium does not flow through the high-pressure pipes any more. Relative positions of the regulating feet and a bottom plate of the washing machine do not change any more, and the automatic regulating of the washing machine is completed.

During the washing or dewatering process of the washing machine, the hydraulic medium can also slowly flow for self-leveling, so that vibration noises of the washing machine are greatly lowered.

According to the embodiment, the hydraulic medium may be hydraulic fluid which is good in fluidity and stable in ingredient.

In addition, the household appliance foot provided by each of the above-mentioned embodiments of the present disclosure, can also be applied to household appliances such as electric refrigerators, coolers and air-conditioner indoor units, besides washing machines.

It should be noted that each of the above-mentioned embodiments of the present disclosure can be implemented independently and can also be implemented by combining a plurality of embodiments.

What described above are only preferred embodiments of the present disclosure, but are not intended to limiting the scope of the present disclosure in any forms. Although the present disclosure has been disclosed in terms of preferred embodiments, it is not limited thereto. Without departing from the scope of the technical solution of the present disclosure, any persons skilled in the present disclosure can make equivalent embodiments with various alterations and modifications as equivalent variations by utilizing the above-mentioned technical contents. However, without departing from the contents of the technical solution of the present disclosure, any simple changes, equivalent variations and modifications made according to the technical essence of the present disclosure shall all be covered within the scope of the technical solution of the present disclosure.

The invention claimed is:

1. A household appliance foot, comprising:
   a hydraulic plate;
   a sheath, being fixedly connected with the hydraulic plate;
   a regulating foot, being arranged in the sheath and being axially movable relative to the sheath;
   an accommodation chamber, being formed by the hydraulic plate, the sheath and the regulating foot;
   a hydraulic medium, being in the accommodation chamber and being compressed or expanding with pressure changes to drive the regulating foot to axially move in the sheath for leveling;
   a communicating device comprising a hydraulic pipe and a communicating member, communicating at least two household appliance feet for allowing the hydraulic medium to flow between the household appliance feet; and
   a throttling flow passage, being arranged in the communicating member; wherein,
   both ends of the throttling flow passage separately communicate with hydraulic pipes,
   a diameter of the throttling flow passage is smaller than a diameter of the hydraulic pipe communicated with the throttling flow passage;
   a pouring port for pouring the hydraulic medium is arranged in the communicating member, a sealing device is mounted on the pouring port in a sealing manner,
   the pouring port is a screw hole, the sealing device includes a bolt and a sealing ring, the bolt is mounted in the screw hole, and the sealing ring is arranged between the bolt and the screw hole for sealing connection.

2. The household appliance foot according to claim 1, wherein
   at least two household appliance feet are connected with one communicating member through hydraulic pipes respectively for communicating with each other.

3. The household appliance foot according to claim 2, wherein the throttling flow passage comprises a diameter-reduced part to form a throttling hole.

4. The household appliance foot according to claim 3, wherein a diameter of the throttling flow passage at a position connected with the pouring port is reduced to form the throttling hole;
   or, a diameter of a middle part of the throttling flow passage located at one side of the pouring port is reduced to form the throttling hole.

5. The household appliance foot according to claim 4, wherein a minimum diameter d of the throttling flow passage meets the condition that: $d \leq 2$ mm.

6. The household appliance foot according to claim 4, wherein a minimum diameter d of the throttling flow passage meets the condition that: d≤1 mm.

7. The household appliance foot according to claim 3, wherein a minimum diameter d of the throttling flow passage meets the condition that: d≤2 mm.

8. The household appliance foot according to claim 3, wherein a minimum diameter d of the throttling flow passage meets the condition that: d≤1 mm.

9. The household appliance foot according to claim 1, wherein a minimum diameter d of the throttling flow passage meets the condition that: d≤6 mm.

10. The household appliance foot according to claim 1, wherein a liquid flow passage for allowing the hydraulic medium to flow is formed in the communicating device, and
    the throttling structure is arranged in the liquid flow passage to allow the flowing damping force of the hydraulic medium to increase, for reducing the flow velocity of the hydraulic medium.

11. A household appliance with the household appliance foot according to claim 1, comprising at least two household appliance feet communicated with each other through the communicating member for allowing the hydraulic medium to flow between the household appliance feet.

12. The household appliance foot according to claim 1, wherein a minimum diameter d of the throttling flow passage meets the condition that: d≤2 mm.

13. The household appliance foot according to claim 1, wherein a minimum diameter d of the throttling flow passage meets the condition that: d≤1 mm.

\* \* \* \* \*